(No Model.) 3 Sheets—Sheet 2.

G. M. CLARK.
REVERSIBLE SULKY PLOW.

No. 367,188. Patented July 26, 1887.

Witnesses.
W. R. Edelin.
E. P. Pelton.

Inventor
Geo. M. Clark
Per.
Simonds & Burdett, Att'ys

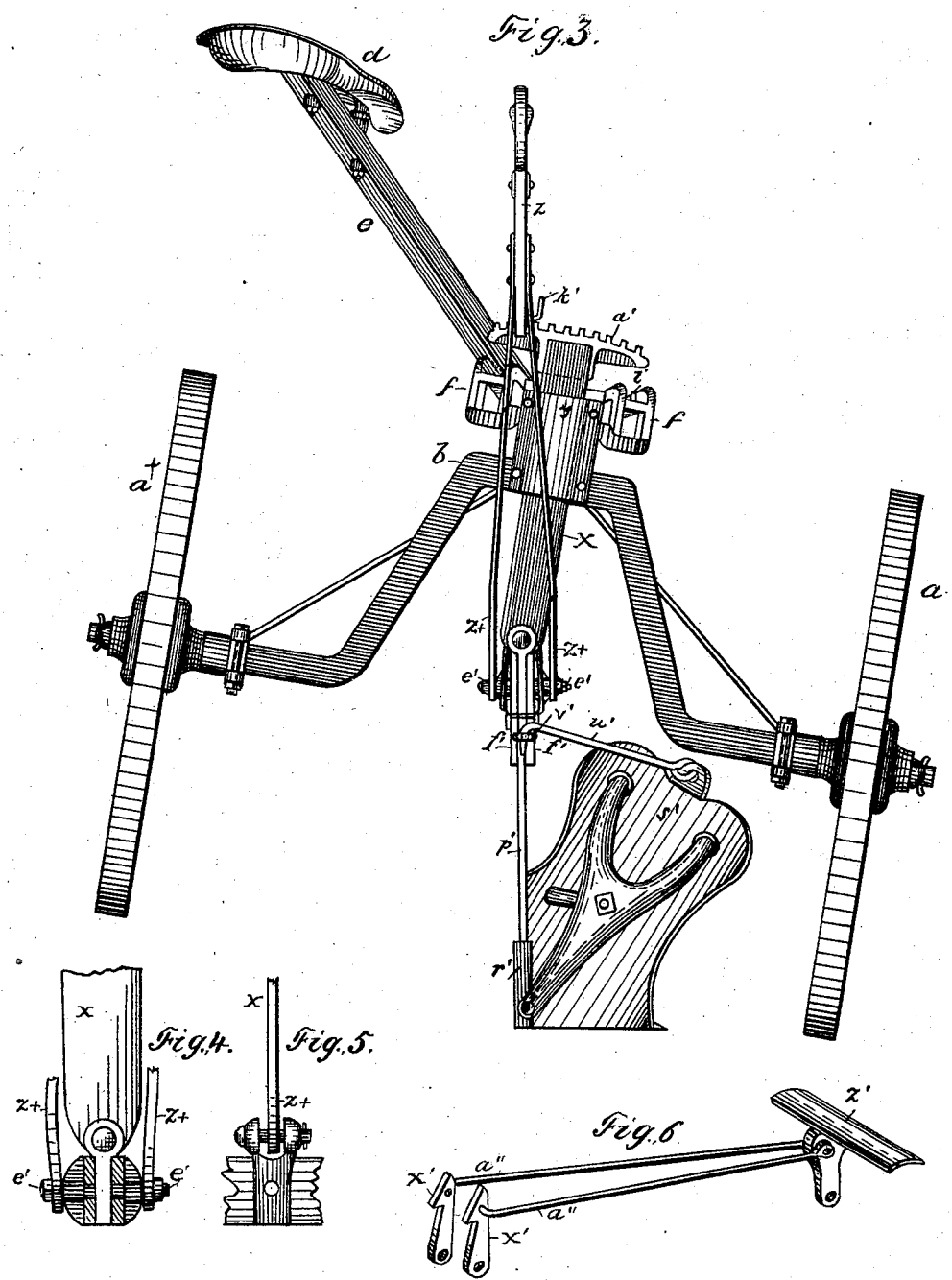

UNITED STATES PATENT OFFICE.

GEORGE M. CLARK, OF HIGGANUM, CONNECTICUT.

REVERSIBLE SULKY-PLOW.

SPECIFICATION forming part of Letters Patent No. 367,188, dated July 26, 1887.

Application filed April 14, 1886. Serial No. 198,783. (No model.)

*To all whom it may concern:*

Be it known that I, GEORGE M. CLARK, of Higganum, in the county of Middlesex and State of Connecticut, have invented a certain new and useful Improvement Pertaining to Reversible Sulky-Plows, of which the following is a description, reference being had to the accompanying drawings, wherein—

Figure 1:
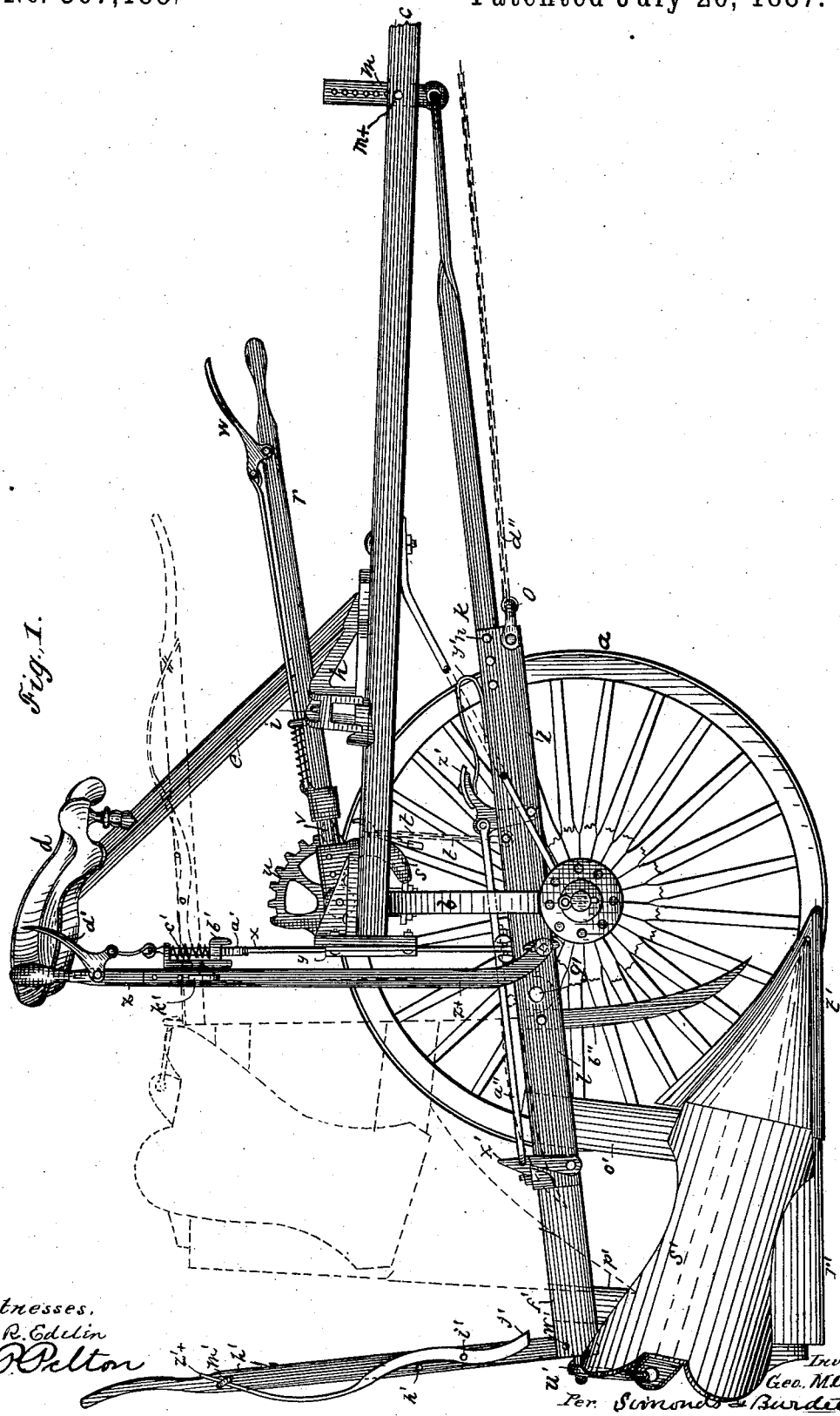
Figure 2:
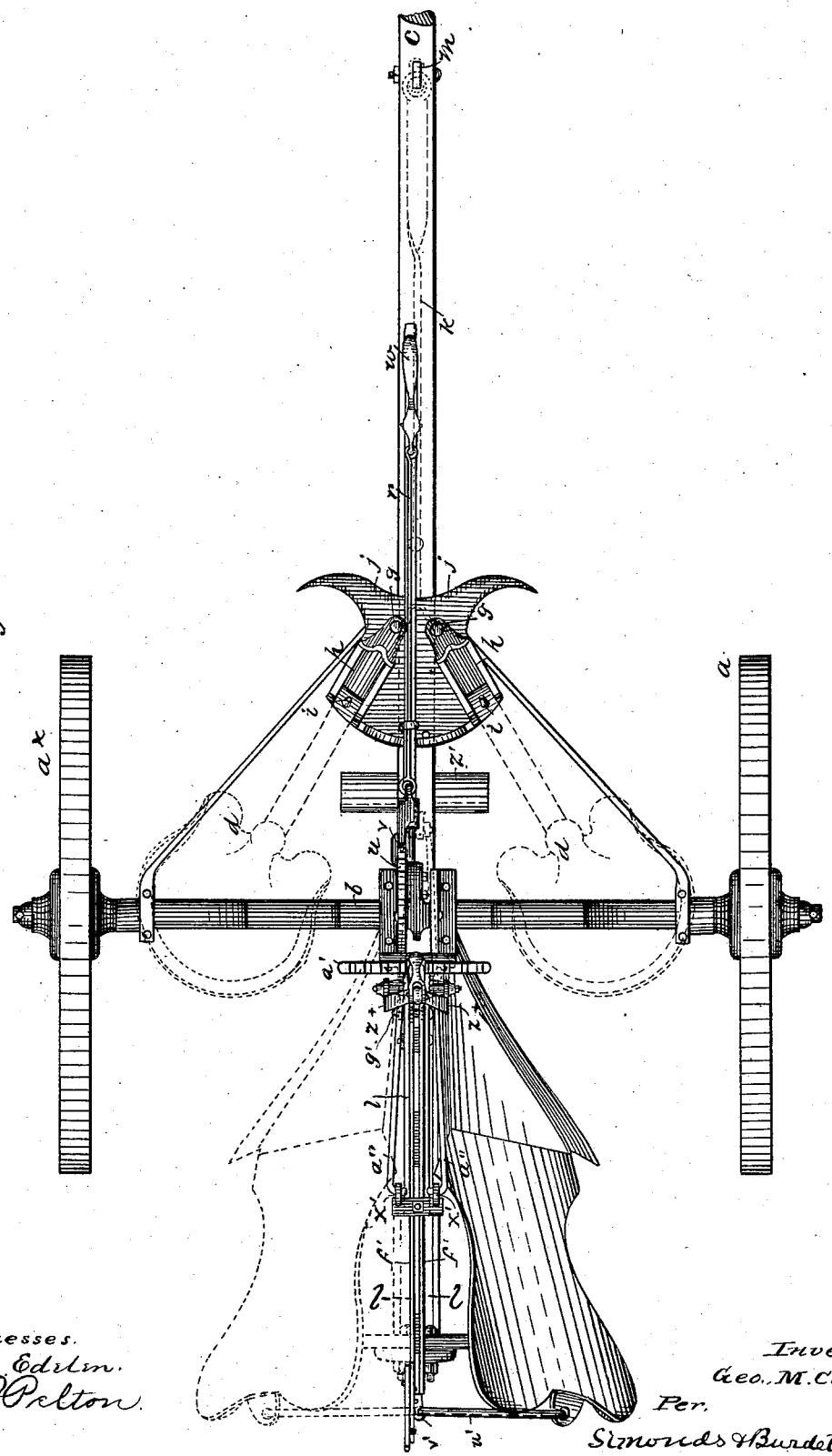

Figure 1 is a side elevation view. Fig. 2 is a plan or top view. Fig. 3 is a rear view. Fig. 4 is a detail view, on an enlarged scale, showing from the rear the attachment of the lever which controls the laterally-pendulous movement of the plow proper to the plow-beam, (which last part is shown in cross-section,) also showing the pivot which allows this pendulous movement. Fig. 5 is a detail view, on an enlarged scale, showing from the side the pivotal connection which allows the laterally-pendulous movement of the plow proper. Fig. 6 is a detail view, on enlarged scale, of the arrangement for confining and releasing the plow proper in its rotarily-vertical reciprocation.

The letter $a$ denotes the right-hand wheel of the machine. The letter $a^x$ denotes the left-hand wheel.

The letter $b$ denotes an "elevated axle," so called because its central part is elevated above its ends for the purpose of giving a suitable elevation to the principal parts of the plow without having to use wheels of undue diameter. This central elevation is attained by a union of what may be called "two cranks," although that union is permanent.

The letter $c$ denotes the pole to which the draft-animals are attached, the rear end of which is fastened to the elevated part of the axle $b$. This attachment of the animals to the pole $c$ is not their principal attachment to the plow, the principal attachment being to a plow-beam, hereinafter described. This plow may have a shifting seat—that is, a seat capable of being shifted from one side of the plow to the other, in accordance with the adjustment of the plow proper—to throw a furrow to one side or the other; or, as I prefer, it has, as indicated by dotted lines in Fig. 2, two permanent seats for this purpose.

The letter $d$ denotes the seat $e$, the seat-standard, preferably of wood, elastic enough to give an easy-riding seat, attached at its lower end to and in the seat-standard socket $h$, fastened to plate $i$ by bolt $g$.

The letters $k\ l\ l$ denote the plow-beam as a whole, the separate parts whereof will be soon described, the forward end of which is jointed to the pole $c$ in such a manner that the plow, which is at the rear end of the beam, can both vibrate vertically and, like a pendulum, laterally. This connection of the fore end of the beam with the pole $c$ is well attained by means of the eye-bar $m$, having adjustable vertical reciprocation in a mortise in the pole $c$, the adjustment being determined by the pin $m^x$. This plow-beam, which as a whole is denoted by the letters $k\ l\ l$, is composed of the beam-section $k$ and the two similar beam-sections, $l\ l$, which are hinged together by the bolt $n$, so that the beam-sections $l\ l$ can vibrate vertically upon the beam-section $k$. This connection can, however, be made rigid by additional bolts running through the beam-sections $k\ l\ l$ where they overlap.

The letter $o$ denotes a draft-clevis by which the draft-animals are attached to the plow-beam, and I desire it to be understood that the plow is drawn through this attachment.

The plow-beam as a whole is raised and lowered by the beam-lifting lever $r$, which is pivoted at the rear end of the pole, and has attached at its lower end a metallic parti-circle, $s$, to which is attached and with which co-operates the chain $t$, the lower end of which is attached to the plow-beam. Alongside the base of the beam-lifting lever $r$ is a toothed quadrant, $u$, and on the beam-lifting lever $r$ there is a spring-catch, $v$, actuated by the handle $w$, which spring-catch co-operates with the toothed quadrant $u$ to hold the lever $r$ at any desired point of adjustment.

The letter $x$ denotes a guide-bar having vertical reciprocation at proper times in a guiding-slot made for it by the cap $y$. The lower end of this guide-bar is swiveled or jointed to the plow-beam (see Fig. 5) in such a manner as to permit that plow-beam (with the plow proper and the other appurtenances) to vibrate laterally like a pendulum, as already suggested. It will be understood that a function of this guide-bar is to keep the plow-beam (and, of course, its appurtenances) in the same (transverse) vertical plane throughout its vertical vibration, at the same time permitting the plow-beam, with the plow and its other appurtenances, to vibrate laterally like a pendulum, as already suggested.

The laterally-pendulous adjustment of the plow-beam and its appurtenances with reference to the guide-bar $x$ is effected through the lever $z$, the upper end of which vibrates back and forth alongside the toothed quadrant $a'$, which is attached to the upper end of the guide-bar $x$. The lever $z$ is held to the quadrant $a'$ in its vibration by the hook $b'$. The lever $z$ bears the spring-catch $c'$, co-operating with the toothed quadrant $a'$, which spring-catch is operated by the handle $d'$, borne on the lever $z$. The lower part of the lever $z$ is forked or made in two parts, of one which goes each side of the plow-beam, which is provided upon each side with a laterally-projecting stud, to the end of which one of each of said forks last referred to is pivotally attached. This arrangement of forking the lower end of the lever $z$ and providing the plow-beam with the laterally-projecting studs just mentioned creates a truss arrangement by which I am enabled to make the lever $z$ very much lighter than I otherwise could, and makes the attachment of the lever $z$ to the beam one of great strength and rigidity. I denote each of the forks last mentioned by the letter $z^\times$, and I denote each of the studs last mentioned by the letter $e'$. (See Fig. 4.) I intend that whenever I mention the letter $z$ the parts $z^\times$ shall be understood as included therein. The points of attachment between the forks $z^\times$ and the studs $e'$ are in the same vertical plane laterally of the plow-beam with the joint by which the guide-bar $x$ is attached to the plow-beam, and practical advantages result therefrom.

The letter $f'$ denotes what I will term the "plow-beam extension." Its forward end is pivoted between the beam-sections $l\ l$ upon the bolt $g'$, giving it and the appurtenant plow parts the capacity of vibrating rotarily in a vertical plane with reference to the plow-beam.

The letter $h'$ denotes a lever attached to the plow-beam extension $f'$, and by manipulating this lever the rider can give the plow-beam extension and the appurtenant plow the vertical adjustment just referred to. This plow-beam extension, with the appurtenant plow, is held, when at the extreme limit of its upward adjustment, by a spring-catch, $j'$, attached to the lever $h'$, and co-operating with the stud $k'$, which stud last mentioned is fast on the side of the lever $z$. The spring-catch $j'$ is pivoted by a bolt, $l'$, upon the lever $h'$. Its forward end is a spring, $z'^{\times}$, running through and bearing on the loop $m'$. The pivotal vibration of the spring-catch $j'$ is limited in one direction by the stop $n'$. The loop $m'$ forms a stop in the other direction.

There is a front plow-standard, $o'$, and a rear plow-standard, $p'$, to which the shoe $r'$ is attached in the ordinary manner. The reversible mold-board $s'$ is pivotally attached to the forward end of the shoe in the ordinary manner, and the rear end of this reversible mold-board is pivotally attached to the rear end of the shoe by intermedially-adjustable parts, or in a manner which is not now new.

The letter $t'$ denotes a share attached to the reversible mold-board in the ordinary manner. The reversible mold-board is held in position in its adjustment upon either side of the plow-beam extension by means of the hook $u'$. This hook takes into the eye-piece $v'$, which eye-piece is adjustable vertically of the plow-beam extension $f'$, for the purpose of bringing the reversible mold-board and share snugly to a proper adjustment. This vertical adjustment of said eye-piece on the plow-beam extension is attained by having the eye-piece enter between the parts of which the plow-beam is composed, it being double and being grasped between the double parts of the plow-beam extension through the agency of the bolts $w'$, which same bolts can be and are made available for attaching the lever $h'$ to the plow-beam extension.

When the plow-beam extension is "let down," so as to be in line with the plow-beam, it is held from escaping from that adjustment by the spring-catch $x'$, (made in duplicate,) being pressed thereto by the spring $y'$, the connection between the two being through the foot-lever $z'$ and the connecting-rod $a''$, (made in duplicate.)

The letter $b''$ denotes a colter pivotally attached by a pivot-bolt between the beam-sections $l\ l$. Its backward play is limited, and it is given this pendulous movement just suggested to the end that when it is incumbered with weeds and trash the driver of the machine may by slightly backing the machine free the trash.

At the forward end of the beam-sections $l\ l$ there is attached a chain, $d''$, which is attached also to the pole, and this attachment to the beam is such that the length of the chain can be adjusted, and the effect of the use of this chain is that when the plow is in the earth to the desired and "set" depth, the chain will be extended and the plow will be straight from end to end; but when the plow is in the earth to any distance short of the desired and set depth, the forward end of the beam-sections $l\ l$ will point downward, and this chain will define the limit of this pointing downward as regards the beam-section $k$.

The attachment of the rear end of the pole $c$ to the axle $b$ is by clamp-bolts, so that the rear end of the pole can be adjusted laterally somewhat upon the axle, and this for the purpose of compensation when the draft-animals exert their draft power unequally or under unequal conditions.

I claim as my improvement—

1. In a wheel-plow having wheels, axle, and pole, the beam part $k$, swiveled to the pole, the beam part $l$, joined to beam part $k$, and the draft-chain $d''$, attached to beam part $l$, all combined and arranged substantially as described, and for the purposes set forth.

2. In a wheel-plow having wheels, axle, and pole, the beam $k\,l$, the draft-chain $d''$, attached to the beam, and the eye-bar $m$, vertically adjustable in the pole, all combined and arranged substantially as described, and for the purposes set forth.

3. In a wheel-plow having wheels, axle, and pole, the vertically-reciprocating guide-bar $x$, and the plow-beam having rotary adjustment upon such guide-bar transversely of the beam, all combined and arranged substantially as described, and for the purposes set forth.

4. In a wheel-plow having wheels, axle, and pole, the combination therewith of a plow-beam rotarily adjustable both vertically and laterally, the plow-beam extension $f'$, (bearing the plow,) rotarily adjustable on the plow-beam, and means for controlling such adjustment of the beam extension, all combined and arranged substantially as described, and for the purposes set forth.

5. In a wheel-plow having wheels, axle, and pole, the combination therewith of the draft-chain $d''$, the plow-beam pivotally attached at its front end to the pole and swiveled rearward to the vertically-reciprocating guide-bar $x$, the lifting-lever $r$ and chain $t$, the rotary adjustment-lever $z$, the hinged beam-extension $f'$, and the lever $h'$, all combined and arranged substantially as described, and for the purposes set forth.

6. In combination, in a wheel-plow, the plow-beam, the beam-extension $f'$, hinged thereto, the catch $x'$, spring $y'$, foot-lever $z'$, and connecting-rod $a''$, all substantially as described, and for the purpose set forth.

GEORGE M. CLARK.

Witnesses:
  WM. EDGAR SIMONDS,
  A. C. TANNER.